(12) United States Patent
Song

(10) Patent No.: US 12,501,522 B1
(45) Date of Patent: Dec. 16, 2025

(54) FOOD WARMING TRAY

(71) Applicant: Qilin Song, Huizhou (CN)

(72) Inventor: Qilin Song, Huizhou (CN)

( * ) Notice: Subject to any disclaimer, the term of this patent is extended or adjusted under 35 U.S.C. 154(b) by 0 days.

(21) Appl. No.: 19/284,600

(22) Filed: Jul. 29, 2025

(30) Foreign Application Priority Data

Jun. 18, 2025 (CN) .......................... 202521254827.5

(51) Int. Cl.
*H05B 3/36* (2006.01)
*A47J 36/24* (2006.01)

(52) U.S. Cl.
CPC ............ *H05B 3/36* (2013.01); *A47J 36/2483* (2013.01); *H05B 2203/003* (2013.01)

(58) Field of Classification Search
CPC . A47J 36/2483; A47J 39/02; H05B 2203/003; H05B 2203/014; H05B 2203/016; H05B 3/145; H05B 3/146; H05B 3/148; H05B 3/34; H05B 3/36
USPC ......................................................... 219/528
See application file for complete search history.

(56) References Cited

U.S. PATENT DOCUMENTS

| 2,987,300 | A | * | 6/1961 | Greene | B29C 48/832 |
| | | | | | 165/169 |
| 12,349,244 | B2 | | 7/2025 | Ye et al. | |
| 12,376,196 | B1 | * | 7/2025 | Ye | H05B 3/36 |

* cited by examiner

*Primary Examiner* — Sang Y Paik

(57) ABSTRACT

Provided is a food warming tray, which includes a warmer pad and a shielding bar. The warmer pad is configured to hold external tableware. Specifically, a groove is provided at the bottom of the warmer pad, and a heating wire is provided in the groove. The shielding bar is arranged at the outlet of the groove to seal the heating wire in the groove. The heating wire is bonded to the shielding bar and side walls of the groove by means of an adhesive. The food warming tray utilizes a combination of the groove and the shielding bar to seal the adhesive between the groove and the shielding bar, forming a closed space to prevent adhesive weathering from direct exposure. The shielding bar can work as an effective thermal insulation to prevent the heat of the heating wire from being transferred to the tabletop and thereby avoiding scorching.

7 Claims, 5 Drawing Sheets

FOOD WARMING TRAY

RELATED APPLICATIONS

The present application claims the benefit of priority of Chinese Patent Application No. 202521254827.5, filed on Jun. 18, 2025, and entitled "FOOD WARMING TRAY," the entire content of which is incorporated herein by reference.

TECHNICAL FIELD

The utility model relates to the technical field of household appliances, and particularly relates to a food warming tray.

BACKGROUND

A food warming tray is a kitchen appliance that can help maintain the temperature of the food. It is particularly suitable for use in winter or in families with elderly and children. By using the heating principle of resistance, it controls the heating power by means of a thermostat, and then conducts heat to the tray to maintain the temperature of the food, effectively preventing the food from getting cold, especially in scenarios such as dining in winter or family gatherings, to greatly improve the comfort of dining.

A food warming tray in the prior art is usually designed with a groove at the bottom of the tray and a heating wire embedded in the groove and then encapsulated with an adhesive. However, this type of structure has the following defects: The adhesive is exposed to the outside and easily weathered, affecting its service life; moreover, the adhesive has almost no heat insulation effect. Even if supporting convex points are provided at the bottom of the food warming tray, so that the bottom surface of the food warming tray does not directly contact with the tabletop, the height of the convex points is generally limited, and much of the heat generated by the heating wire can still easily be transferred to the tabletop and thereby avoiding scorching.

SUMMARY

The utility model aims to solve one of the technical problems of the prior art. For this purpose, the utility model proposes a food warming tray, which is designed with a shielding bar that seals the heating wire and adhesive in the groove to prevent the adhesive from being easily weathered due to direct exposure, and can work as an effective thermal insulation to prevent the heat of the heating wire from being transferred to the tabletop and thereby avoiding scorching.

The food warming tray according to the embodiments of the utility model includes a warmer pad and a shielding bar. The warmer pad is configured to hold external tableware. Specifically, a groove is provided at the bottom of the warmer pad, and a heating wire is provided in the groove. The shielding bar is arranged at the outlet of the groove to seal the heating wire in the groove. The heating wire is bonded to the shielding bar and side walls of the groove by means of an adhesive.

The food warming tray according to the embodiments of the utility model, with the design mentioned above, can achieve at least the following beneficial effect: The design with a combination of the groove and the shielding bar seals the adhesive between the groove and the shielding bar, forming a closed space, thereby preventing the adhesive from being easily weathered due to direct exposure. In addition, the shielding bar can work as an effective thermal insulation to prevent the heat of the heating wire from being transferred to the tabletop and thereby avoiding scorching. The groove provides a stable mounting position for the heating wire to prevent it from displacement or loosening during use. In addition, the heating wire is fixed by two means at the same time, namely the shielding bar and the adhesive, which can prevent the heating wire from being squeezed or worn by external force, thereby ensuring stable and safe heating.

According to some embodiments of the utility model, the groove includes an accommodating slot for the heating wire and a mounting slot for placing the shielding bar. Specifically, the mounting slot is arranged at the opening of the accommodating slot, and the accommodating slot is connected to the mounting slot.

According to some embodiments of the utility model, the shielding bar is embedded in the mounting slot to seal the heating wire in the accommodating slot, and the cross-sectional width of the mounting slot is greater than the cross-sectional width of the accommodating slot.

According to some embodiments of the utility model, the mounting slot includes an outlet section and a mounting section along the thickness direction of the warmer pad. The cross-sectional width of the mounting section is greater than the cross-sectional width of the outlet section, and the shielding bar is placed into the mounting section from the outlet section, and embedded in the mounting section.

According to some embodiments of the utility model, an arc-shaped transition surface is provided at the connection between the mounting section and the outlet section, and the shielding bar abuts against the arc-shaped transition surface.

According to some embodiments of the utility model, the cross-sectional width of the outlet section is 2.5 mm, the cross-sectional width of the mounting section is 3-3.5 mm, the cross-sectional width of the groove is 2 mm, and the cross-sectional width of the accommodating slot is not less than the diameter of the heating wire.

According to some embodiments of the utility model, the shielding bar is embedded in the mounting section, leaving a gap between the shielding bar and the heating wire in the accommodating slot, with the adhesive filled in the gap.

According to some embodiments of the utility model, the warmer pad is made of a flexible material.

According to some embodiments of the utility model, a power supply unit is also included, and both ends of the heating wire are electrically connected to the power supply unit to form a closed circuit.

According to some embodiments of the utility model, a plurality of protruding structures are provided at the bottom of the warmer pad.

Additional aspects and advantages of the utility model will be partially set forth in the following description, partially become apparent from the following description or be appreciated by practice of the utility model.

BRIEF DESCRIPTION OF THE DRAWINGS

The above and additional aspects and advantages of the utility model will become apparent and readily understood from a description of embodiments in connection with the following drawings, in which.

REFERENCE NUMERALS

Figure 1:
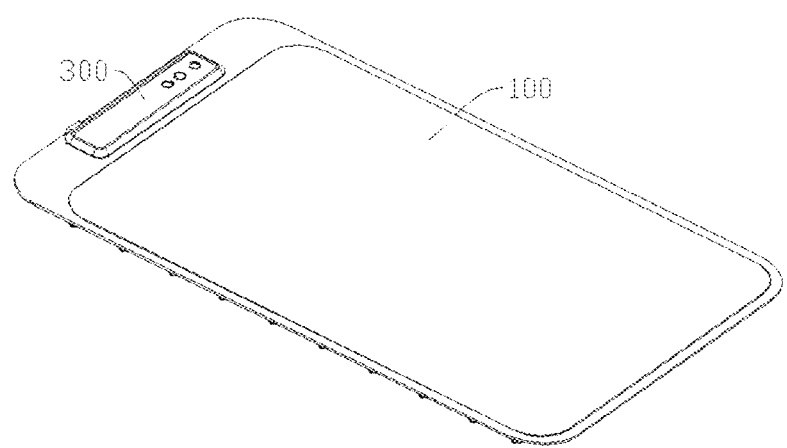
FIG. 1 is a schematic diagram of the front structure of a food warming tray according to an embodiment of the utility model.

Warmer pad 100, groove 12, accommodating slot 120, outlet section 121, mounting section 122, protruding structure 130, heating wire 140, shielding bar 200, power supply unit 300.

DETAILED DESCRIPTION

Embodiments of the utility model are described in detail below, examples of which are shown in the accompanying drawings, and like or similar reference numerals throughout designate identical or similar elements or elements having the same or similar functions. The embodiments described below with reference to the accompanying drawings are exemplary and only for explaining the utility model, and shall not be understood as limiting the utility model.

In the description of the utility model, it should be understood that the azimuth or positional relationship related to the orientation description, such as "up", "down", "front", "rear", "left", and "right", is based on the azimuth or positional relationship shown in the drawings, which is only for facilitating the description of the utility model and simplifying the description, rather than indicating or implying that the target device or component must have a specific orientation and be structured and operated at a specific orientation, so it cannot be construed as limiting the utility model.

In the description of the utility model, "several" means one or more, and "a plurality of" means more than two; "greater than", "less than", "exceeding", etc. are understood as excluding the number itself, and "above", "below", "within", etc. are understood as including the number itself. The terms "first" and "second", if described, are only for the purpose of distinguishing technical features, and cannot be understood as indicating or implying relative importance, implying the number of indicated technical features or implying the sequential relationship between the indicated technical features.

In the description of this utility model, unless otherwise restricted, the terms "provided", "mounted", and "connected" shall be understood in a general sense. Those skilled in the relevant technical field can reasonably determine the specific meanings of the above terms in the utility model in combination with the specific content of the technical solution.

The following describes a food warming tray according to the embodiments of the utility model with reference to FIGS. 1 to 5.

The food warming tray according to the embodiments of the utility model includes a warmer pad 100 and a shielding bar 200. The warmer pad is configured to hold external tableware. Specifically, a groove 12 is provided at the bottom of the warmer pad 100, and a heating wire 140 is provided in the groove 12. The shielding bar 200 is arranged at the outlet of the groove 12 to seal the heating wire 140 in the groove 12. The heating wire 140 is bonded to the shielding bar 200 and side walls of the groove 12 by means of an adhesive.

Figure 3:
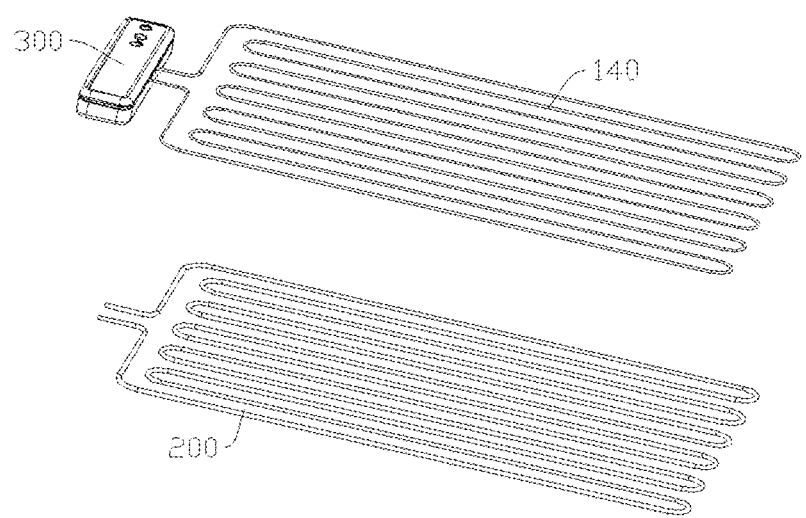
FIG. 3 is a schematic breakdown diagram of the internal structure of a food warming tray according to an embodiment of the utility model.
Figure 5:
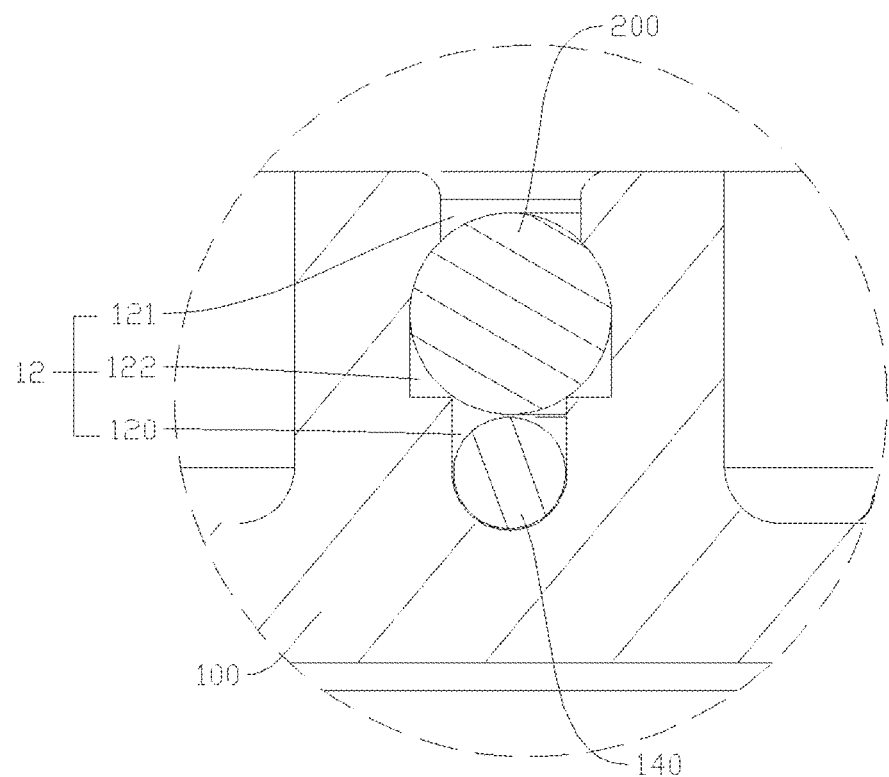
FIG. 5 is an enlarged view of the structure of area A in FIG. 4.

For example, as shown in FIGS. 3 and 5, the groove 12 is arranged in a winding manner at the bottom of the warmer pad 100, and the heating wire 140 is laid along the direction of the groove 12, so that the entire warmer pad heats more evenly. The shielding bar 200 is provided at the outlet of the groove 12 to seal the heating wire 140 in the groove 12, with the adhesive filled between the shielding bar 200 and the inner wall of the groove 12, to form a complete sealing layer.

The food warming tray according to the embodiments of the utility model, with the design mentioned above, can achieve at least the following beneficial effect: The design with a combination of the groove 12 and the shielding bar 200 seals the adhesive between the groove 12 and the shielding bar 200, forming a closed space, thereby effectively preventing the adhesive from being weathered and cracked caused by factors such as air and moisture due to direct exposure, and extending the service life of the food warming tray. The shielding bar 200 closes the outlet of the groove 12, which can prevent foreign matters such as insects and dust from entering the groove 12 and sticking to the adhesive, to reduce the difficulty of cleaning, and keep a clean environment inside the food warming tray. The groove 12 provides a stable mounting position for the heating wire 140 to prevent it from displacement or loosening during use. In addition, the heating wire 140 is fixed by two means at the same time, namely the shielding bar 200 and the adhesive, which can prevent the heating wire 140 from being squeezed or worn by external force, thereby ensuring stable and safe heating. This structural design facilitates mounting and replacement of the heating wire 140. The heating wire 140 can be repaired or replaced by simply removing the shielding bar 200, which reduces the cost and difficulty of maintenance.

In some specific embodiments of the utility model, the groove 12 includes an accommodating slot 120 for the heating wire 140 and a mounting slot for placing the shielding bar 200. Specifically, the mounting slot is arranged at the opening of the accommodating slot 120, and the accommodating slot 120 is connected to the mounting slot.

Figure 4:
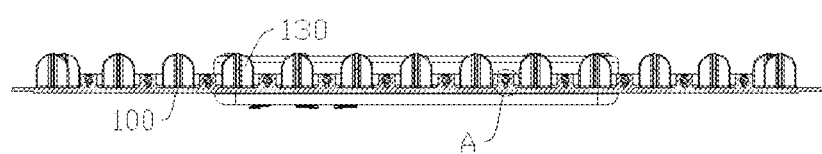
FIG. 4 is a cross-sectional view of the food warming tray according to an embodiment of the utility model.

For example, as shown in FIGS. 4 and 5, the groove 12 includes an accommodating slot 120 for the heating wire 140 and a mounting slot for placing the shielding bar 200. Specifically, the accommodating slot 120 is connected to the mounting slot, with the cross-sectional width greater than the cross-sectional width of the groove 12. The shielding bar 200 is embedded in the mounting slot, and the longitudinal portion covers the opening of the groove 12, forming an inverted "convex" sealing structure between the accommodating slot 120 and the mounting slot.

The width difference between the mounting slot and the accommodating slot 120 forms a step structure, where the adhesive forms a double sealing surface after the shielding bar 200 is embedded. The widened mounting slot allows the shielding bar 200 to slide horizontally into the slot and be fixed in the slot. When maintenance is needed, it is only necessary to pull out the shielding bar 200 along the direction of the slot without destroying the adhesive.

In some specific embodiments of the utility model, the shielding bar 200 is embedded in the mounting slot to seal the heating wire 140 in the accommodating slot 120, and the cross-sectional width of the mounting slot is greater than the cross-sectional width of the accommodating slot 120.

For example, as shown in FIGS. 4 and 5, the shielding bar 200 is embedded in the mounting slot to seal the heating wire 140 in the accommodating slot 120, and the cross-sectional width of the mounting slot is greater than the cross-sectional width of the accommodating slot 120. The width difference between the mounting slot and the accommodating slot 120 forms a step structure, and the widened mounting slot allows the shielding bar 200 to slide horizontally into the slot and be fixed in the slot. When maintenance is needed, it is only necessary to pull out the shielding bar 200 along the direction of the groove body without destroying the adhesive.

In some specific embodiments of the utility model, the mounting slot includes an outlet section 121 and a mounting section 122 along the thickness direction of the warmer pad 100. The cross-sectional width of the mounting section 122 is greater than the cross-sectional width of the outlet section 121, and the shielding bar 200 is placed into the mounting section 122 from the outlet section 121, and embedded in the mounting section 122.

For example, as shown in FIG. 5, the mounting slot includes an outlet section 121 and a mounting section 122 along the thickness direction of the warmer pad 100. The cross-sectional width of the mounting section 122 is greater than the cross-sectional width of the outlet section 121. After the shielding bar 200 is inserted from the outlet section 121, it is clipped in the mounting section 122, to form a stepped interlocking structure.

In some specific embodiments of the utility model, an arc-shaped transition surface is provided at the connection between the mounting section 122 and the outlet section 121, and the shielding bar 200 abuts against the arc-shaped transition surface.

For example, as shown in FIG. 5, an arc-shaped transition surface is provided at the connection between the mounting section 122 and the outlet section 121, and the corresponding position of the shielding bar 200 is designed as a matching arc-shaped profile, which fits tightly with the transition surface when the shielding bar 200 is inserted.

The arc-shaped transition surface avoids stress concentration caused by the right-angle structure, and reduces the resistance when the shielding bar 200 is inserted, resulting in a smoother mounting process while avoiding hard friction.

In some specific embodiments of the utility model, the cross-sectional width of the outlet section 121 is 2.5 mm, the cross-sectional width of the mounting section 122 is 3-3.5 mm, the cross-sectional width of the groove 12 is 2 mm, the cross-sectional width of the accommodating slot 120 is not less than the diameter of the heating wire, and preferably the diameter of the heating wire is 2 mm. The above size values are a preferred solution for this embodiment, but should not be taken as a limit to the scope of protection of the present application. Any solution that the diameter of the heating wire is smaller than the cross-sectional width of the outlet section 121 and smaller than the cross-sectional width of the mounting section 122 should be understood to fall within the scope of protection of the present application.

The cross-sectional width of the accommodating slot 120 is not less than the diameter of the heating wire, so that the heating wire 140 can be placed in the accommodating slot 120.

In some specific embodiments of the utility model, the warmer pad 100 is made of a flexible material, and the shielding bar 200 is also made of a flexible material. The flexible materials can be and are not limited to soft rubber, TPE/TPR, PU/PVC, and natural rubber. Other common flexible materials should also fall within the scope of protection of this patent. The warmer pad 100 is made of a flexible material, so that the food warming tray can be rolled up or folded up for easy storage.

In some specific embodiments of the utility model, a power supply unit 300 is also included, and both ends of the heating wire 140 are electrically connected to the power supply unit 300 to form a closed circuit.

For example, as shown in FIGS. 1 and 3, the power supply unit 300 is connected to both ends of the heating wire 140 by means of wire to form a closed loop. The power supply unit 300 has a built-in temperature control element to heat the heating wire 140 and control its temperature.

In some specific embodiments of the utility model, a plurality of protruding structures 130 are provided at the bottom of the warmer pad 100.

Figure 2:
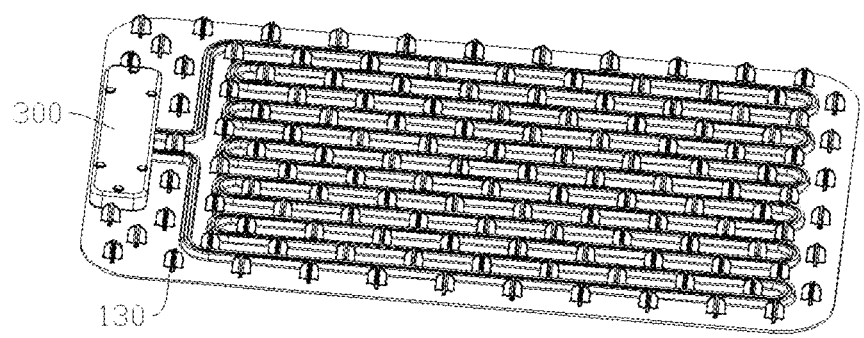
FIG. 2 is a schematic diagram of the bottom structure of a food warming tray according to an embodiment of the utility model.

For example, as shown in FIG. 2, the protruding structures 130 are evenly distributed at the bottom of the warmer pad 100, and the entire food warming tray is supported by the protruding structures 130, so that there is a certain gap between the warmer pad 100 and the tabletop, maintaining air circulation to a certain extent, which can dissipate heat and prevent the warmer pad 100 from scorching the tabletop.

In the description of the specification, descriptions with reference to the terms "one embodiment", "some embodiments", "illustrative embodiment", "example", "specific example", or "some examples" mean that specific features, structures, materials or characteristics described in combination with the embodiment or example are contained in at least one embodiment or example of the utility model. In the specification, the schematic expressions of the above terms do not necessarily refer to the same embodiments or examples. Moreover, the specific features, structures, materials, or characteristics described may be combined in any one or more embodiments or examples in a suitable manner.

Although embodiments of the utility model have been shown and described, it will be understood by those of ordinary skill in the art that many changes, modifications, substitutions and variations can be made to these embodiments without departing from the principle and purpose of the utility model, and the scope of the utility model is defined by the claims and their equivalents.

What is claimed is:

1. A food warming tray, comprising:
    a warmer pad (100), configured to hold external tableware, wherein a groove (12) is provided at a bottom of the warmer pad (100), and a heating wire (140) is provided in the groove (12); and
    a shielding bar (200), arranged at an outlet of the groove (12) to seal the heating wire (140) in the groove (12);
    wherein the heating wire (140) is bonded to the shielding bar (200) and side walls of the groove (12) by means of an adhesive;
    wherein the groove (12) comprises an accommodating slot (120) for the heating wire (140) and a mounting slot for the shielding bar (200), wherein the mounting slot is arranged at an opening of the accommodating slot (120), and the accommodating slot (120) is connected to the mounting slot;
    wherein the mounting slot comprises an outlet section (121) and a mounting section (122) along the thickness direction of the warmer pad (100), wherein a cross-sectional width of the mounting section (122) is greater than a cross-sectional width of the outlet section (121), and the shielding bar (200) is placed into the mounting section (122) from the outlet section (121), and embedded in the mounting section (122);
    wherein an arc-shaped transitional surface is provided at connection between the mounting section (122) and the outlet section (121), and the shielding bar (200) abuts against the arc-shaped transitional surface.

2. The food warming tray according to claim 1, wherein the shielding bar (200) is embedded in the mounting slot to seal the heating wire (140) in the accommodating slot (120), wherein a cross-sectional width of the mounting slot is greater than a cross-sectional width of the accommodating slot (120).

3. The food warming tray according to claim 1, wherein the cross-sectional width of the outlet section (121) is 2.5 mm, the cross-sectional width of the mounting section (122) is 3-3.5 mm, a cross-sectional width of the accommodating slot (120) is 2 mm, and the cross-sectional width of the accommodating slot (120) is not less than the diameter of the heating wire.

4. The food warming tray according to claim 1, wherein the shielding bar (200) is embedded in the mounting section (122), leaving a gap between the shielding bar (200) and the heating wire in the accommodating slot (120), with the adhesive filled in the gap.

5. The food warming tray according to claim 1, wherein the warmer pad (100) is made of a flexible material.

6. The food warming tray according to claim 1, further comprising a power supply unit (300) on the warmer pad, wherein the heating wire (140) is electrically connected to the power supply unit (300) to form a closed circuit.

7. The food warming tray according to claim 1, wherein a plurality of protruding structures (130) are provided at the bottom of the warmer pad (100).

\* \* \* \* \*